March 25, 1924.  1,488,228
W. G. BURNS
MIXING BIN
Filed April 5, 1923  2 Sheets-Sheet 2
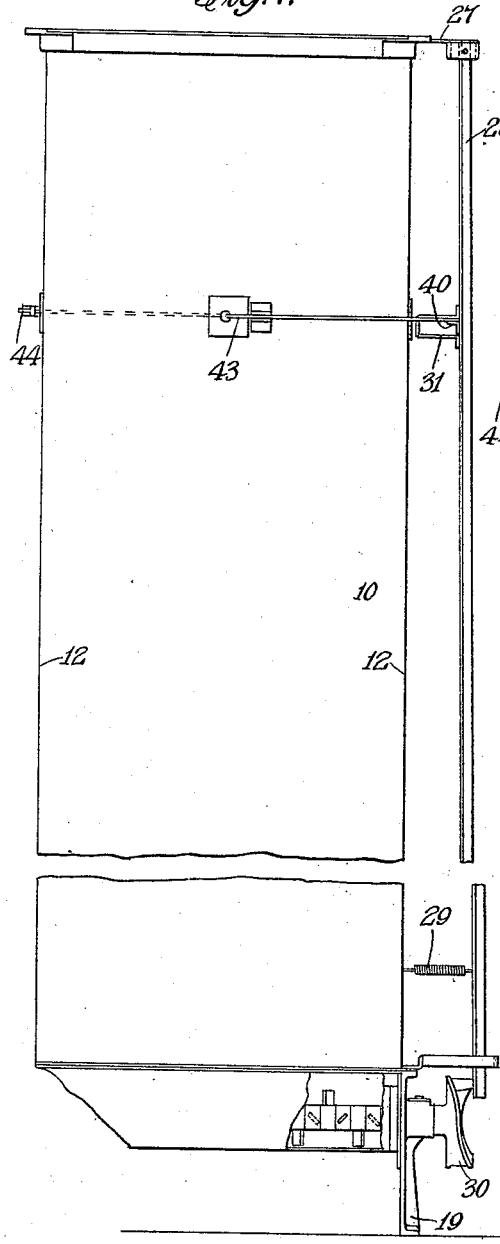
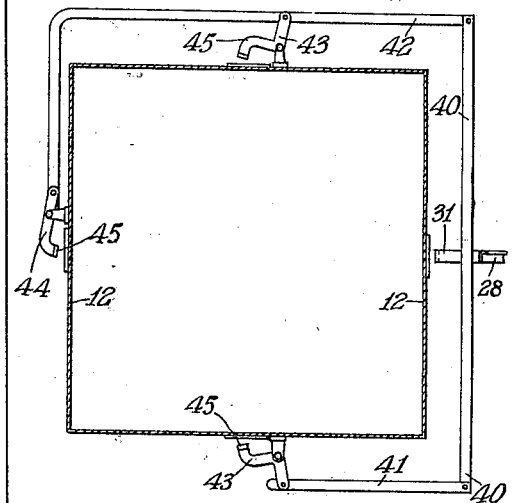
Inventor
William G. Burns
By his Attorney Patented Mar. 25, 1924.

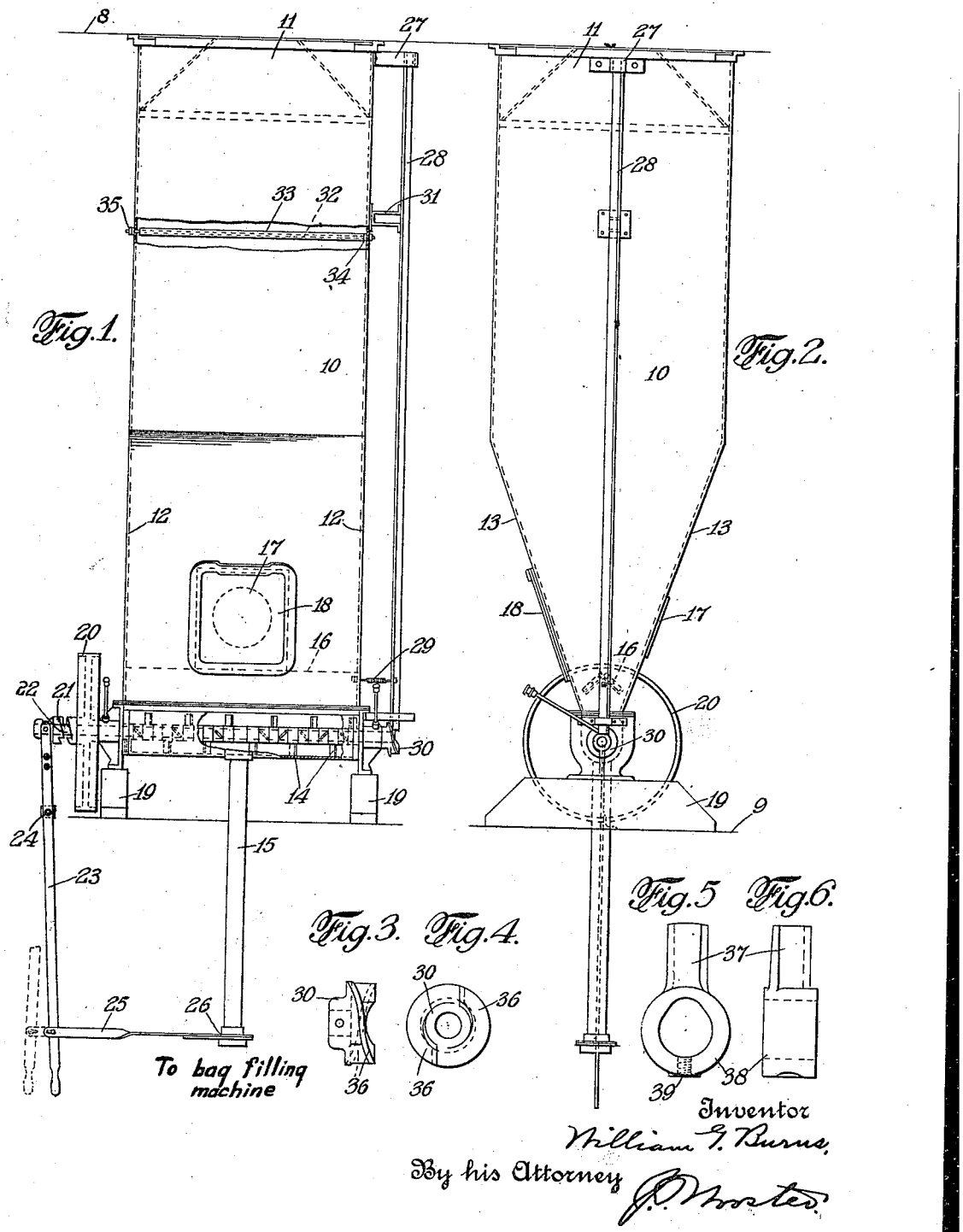

1,488,228

UNITED STATES PATENT OFFICE.

WILLIAM G. BURNS, OF NEW YORK, N. Y., ASSIGNOR TO JABEZ BURNS & SONS, OF NEW YORK, N. Y., A CORPORATION OF NEW YORK.

MIXING BIN.

Application filed April 3, 1923. Serial No. 629,548.

*To all whom it may concern:*

Be it known that I, WILLIAM G. BURNS, a citizen of the United States, and resident of New York, in the county of New York and State of New York, have invented certain new and useful Improvements in Mixing Bins, of which the following is a specification.

This invention relates to a bin for fine or pulverulent, non-homogeneous products, such as ground coffee, and has for its object to supply a uniform mixture of the product to packaging equipment.

When coffee has been ground or cut and discharged to a storage bin before packing, difficulty has been experienced in obtaining a uniform product in the packages because of an accumulation of chaff on the sides of the bin which would only come down at the end of the run. This is especially liable to happen to a large daily shipper of packed ground coffee because generally only enough coffee is ground each day to supply the orders or at least any coffee ground should be packed the same day as it deteriorates if not packed shortly after grinding.

The ground coffee entering the bin necessarily contains a certain amount of finely divided particles which tend to adhere to the sides of the bin with the result that the packages filled from the first portion of the run are relatively free from this fine material but toward the end there is likely to be an excessive amount of chaff or other finely divided material which has become loosened from the sides of the bin. The bin of this invention insures that a uniform mixture will be fed to the packaging machinery from each lot of raw material ground.

According to this invention, the ground product falls into a bin composed of flexible vibratable metal from which it is delivered to the bag filling machine. For preventing fine material from adhering to the sides of the bin, a tapping mechanism is provided to vibrate the bin sides to loosen adherent material. At the same time, a feed and mixing screw located adjacent the bottom of the bin conveys the mixture toward the outlet and in the preferred embodiment this conveyor brings the material from opposite side towards an outlet in the central portion of the bin. A valve in this outlet leading to the bag filling machine is controlled by the same lever which actuates a clutch to stop and start the screw mixer and the tapping mechanism.

One installation of this invention for the treatment of coffee has the roasting, cooling, and grinding or cutting mechanism located on an upper floor with the bin mounted on a floor below and into which the ground material falls. On a floor below the bin is arranged the weighing and bag filling machine. The control handle for the outlet from the bin and for the mixing screw and tapping mechanism passes through the floor below the bin and is adapted to be controlled by the operator at the bag filling machine.

Referring to the drawings,

Fig. 1 is an elevation of the improved shaking bin,

Fig. 2 is a side view of the device shown in Fig. 1,

Figs. 3 and 4 are side and end details of the cam,

Figs. 5 and 6 are end and side details of one of the vanes of the mixing screw,

Fig. 7 shows an embodiment of this invention for tapping all sides of the bin, and Fig. 8 is a plan view showing the arrangement of the tapping mechanism for all sides of the bin.

Located on an upper floor 8 in one installation of this invention for treating coffee are the roasting, cooling, and grinding or cutting machines for the coffee. The weighing and bag filling machine is located beneath the intermediate floor 9 on which is mounted the improved shaking bin 10. The bin is composed of flexible or resilient sheet metal which will warp and spring back when suitably sprung or tapped, so as to dislodge adherent material as it falls down from above. The ground coffee is fed in through the opening 11 at the top of the bin from the grinding machine and passes through the outlet 15 at the bottom of the bin into the bag filling machine as required. In the form illustrated in Figs. 1 and 2, the sides 12 of the bin are substantially parallel while the sides 13 slope downwardly to the feed and mixing screw 14 with opposite threads feeding to the center located in the bottom of the bin. To relieve the mixing screw from the entire weight of the contents of the bin, a sloping shield 16 may be arranged inside the bin just above the mixing screw 14. One of the sloping sides 13 may be provided with a removable cover 17 and a window 18 may also be provided on another side to enable the contents of the bin to be seen at any time and adapted to be removed for cleaning or repairs inside the bin. Mounted on suitable supports 19 on the floor 9 is the shaft 22 extending through the lower portion of the bin provided with a loose pulley 20 for the transmission of power thereto and also having a clutch 21. For controlling the rotation of the shaft from the pulley 20 with which the clutch 21 connects the shaft, a control handle 23 is pivoted at 24 and extends below the floor 9 so as to be within reach of the operator at the bag filling machine. A gate or valve 26 in the outlet passage 15 from the bin is connected with the control handle 23 so as to be moved thereby at the same time the clutch 21 is operated, whereby the feed to the bag filling machine is opened at the same time the mixing vanes 14 are started.

To prevent the adherence of fine material to the walls of the bin 10, a bar 28 is pivoted at 27 adjacent the side of the bin and pressed against the cam 30 on the shaft 22 by the spring 29. A head 31 is fastened to the bar 28 for warping or tapping a side of the bin as the cam rotates and suddenly releases the lower end of the bar when it is snapped toward the bin by the spring 29 to have the head 31 impinge against the side of the bin. The cam is shown in Figs. 3 and 4 as provided with two inclined faces 36, whereby the bar 28 is released twice in each revolution of the shaft 22. For transmitting the warping impact of the head 31 to also warp the opposite side of the bin, a rod 32 is bolted at 34 to the side of the bin adjacent the point of impact of the head 31. A sleeve 33 on the rod 32 transmits a thrust of the tapped side to the opposite side of the bin while a lock nut 35 on the rod 32 imparts an impact to said opposite side when the rod 32 is moved in a reverse direction. If desired, there may be a limited amount of lost motion or free movement between the end of the sleeve 33 and the lock nut 35.

Figs. 5 and 6 show a detail of the mixing screws which have the thread 37 arranged at the desired pitch and secured to a body portion 38 which may be held on the shaft 22 by a set screw 39 or other means. The lower end of the bin is shaped closely adjacent the feed screw 14 for feeding the material to the outlet 15.

In Figs. 7 and 8 is shown another embodiment of my invention substantially like that shown in Figs. 1 and 2 with regard to the mechanism in the lower portion of the bin but differing therefrom by providing means for warping or tapping more than one side of the bin without having the mechanism pass through the inside of the bin to become covered with the ground product or tend to impede the passage of the product through the bin. The tapping bar 28 is provided with usual head 31 but in addition, a plurality of bell crank levers 43 pivoted to other sides of the bin are connected by the links 40, 41 and 42 with bar 28 and adapted to be actuated thereby to simultaneously warp or tap more than one side of the bin. The warping or tapping mechanism opposite the head 31 is shown in Fig. 8 as comprising a lever 44 pivoted to the bin and to the link 42. Each of the levers 43 and 44 are provided with tapping heads 45 adapted to impinge the side of the bin and loosen fine material.

Among the advantages of this invention may be enumerated the freedom from accumulation of more of fine materials in one package than in another. The tapping mechanism automatically jars the bin as long as the outlet is open. The fine material is shaken down as it falls from above, and is thoroughly mixed with the rest of the material in the bin. The mixing and feeding screw 14 insures that a uniform mixture from the entire width of the bin will be fed out at the center discharge. In the embodiment shown in Figs. 7 and 8 the tapping mechanism is entirely external to the bin and does not obstruct the passage of the ground product through the bin.

While this invention has been described for use with coffee treating machines, it is also adapted for use with other products having fine material which tends to adhere to the sides of the bin. By the statement that the dislodging and mixing means operate simultaneously is not meant that they are in exact synchronism, but rather that they operate at substantially the same time that the discharge occurs.

I claim:

1. A ground coffee and chaff mixing and discharging bin provided with an outlet in the lower portion thereof, means for dislodging the chaff and fine particles tending to adhere to the sides thereof, and mechanism below said means for conveying the contents of the bin toward the outlet and for mixing the loosened particles with the main body of the bin contents, said dislodging means and said mixing and conveying mechanism being operable substantially simultaneously with filling and discharge whereby the discharge comprises substantially constant mixture of coffee with chaff and fine particles.

2. A bin having an outlet in the lower portion thereof, means for warping a side of the bin to loosen any fine adherent particles, and mechanism in the lower portion of the bin to receive the loosened fine particles, thoroughly mix the same with the rest of the bin contents, and discharge the mixture from said bin.

3. A passageway provided with means for passing a ground product therethrough, and means for simultaneously tapping several sides of the passageway to dislodge adherent material.

4. A bin, tapping means for striking a side thereof, mixing and discharging means within said bin, a gate controlling the discharge, and means for simultaneously controlling the mixing means, tapping means, and gate.

5. A bin, tapping means for striking a side thereof, a discharge means, a gate therein, and a device for simultaneously controlling both the tapping means and gate.

6. A ground coffee and chaff mixing and discharging bin provided with an outlet in the lower portion thereof, means for dislodging the chaff and fine particles tending to adhere to the sides of the bin, mechanism for conveying the contents of the bin toward the outlet and for mixing the loosened particles with the main body of the bin contents, and means for actuating said first mentioned means at least while said mixing and conveying mechanism is in operation.

7. The combination with a bin having an outlet in the lower portion thereof, of a mixing and conveying screw in the bottom of the bin for moving the contents toward said outlet, a shaft on which said screw is mounted, a hammer attached to a side of the bin, means on said shaft and outside the bin for actuating said hammer to tap the bin and loosen any adherent material.

8. A ground coffee and chaff mixing and discharging bin provided with an outlet in the lower portion thereof, means for dislodging the chaff and fine particles tending to adhere to the sides of the bin, mechanism for conveying the contents of the bin toward the outlet and for mixing the loosened particles with the main body of the bin contents, and means for simultaneously controlling said first mentioned means and said mechanism.

Signed at New York, in the county of New York and State of New York, this 30 day of March A. D. 1923.

WILLIAM G. BURNS.